Jan. 1, 1952     A. KEHM     2,580,928
FLOW INDICATOR
Filed Oct. 3, 1950
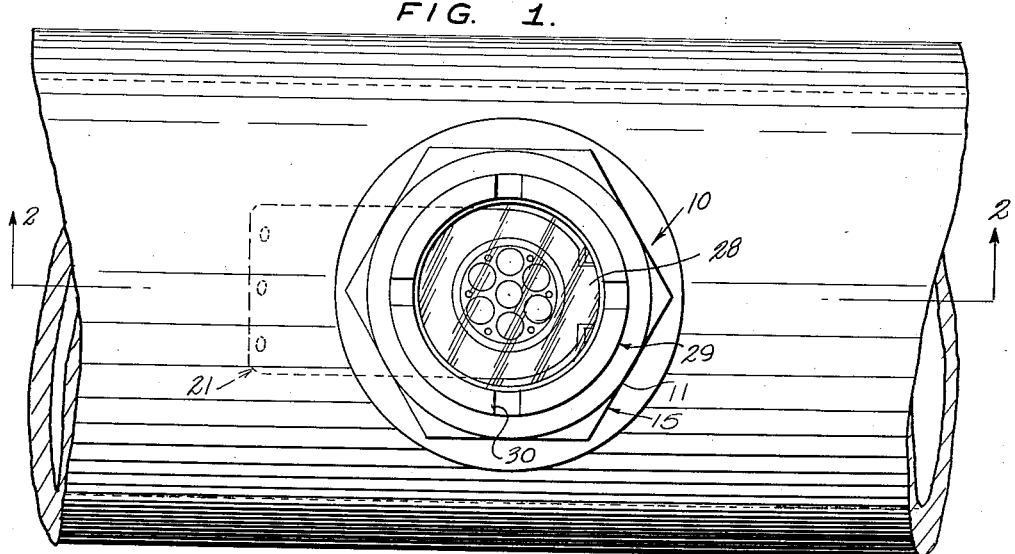
INVENTOR.
ALEX KEHM,
BY
McMorrow, Berman & Davidson
ATTORNEYS.

Patented Jan. 1, 1952

2,580,928

UNITED STATES PATENT OFFICE 2,580,928

FLOW INDICATOR

Alex Kehm, Grand Island, Nebr.

Application October 3, 1950, Serial No. 188,195

3 Claims. (Cl. 116—117)

This invention relates to a flow indicator for a conduit.

An object of this invention is to provide a flow indicator which is particularly adapted to visually indicate the presence or absence of fluid flow through a conduit.

Another object of this invention is to provide a flow indicator which can be secured in a pipe line with speed and facility to visually indicate the flow of fluid through the pipe line.

A further object of this invention is to provide a flow indicator which is particularly adapted for use in a horizontally disposed sewage system conduit having a unidirectional sewage flow therethrough.

A still further object of this invention is to provide a flow indicator which is relatively simple in structure and cheap to manufacture.

The above and still further objects and advantages of the invention will become apparent upon consideration of the following detailed description of the invention, when taken in conjunction with the accompanying drawings, wherein:

Figure 1 is a top plan view of the fluid flow indicator of the present invention, shown supported within a pipe line, the latter being broken away and shown in section; and Figure 2 is a sectional view taken along the line 2—2 of Figure 1, with the flow indicating arm partially shown in elevation.

Referring now more particularly to the drawings, wherein like reference numerals have been used throughout the several views to designate like parts, there is shown the flow indicator of the present invention, generally designated by the reference numeral 10, supported within a flanged radial threaded hole 11 provided in the top wall of a fluid-carrying conduit or pipe line 12.

The flow indicator 10 comprises an open-ended vertical sleeve 15 which is externally threaded from its inward or lower end 16 to a point near the outward or upper end 17, the sleeve being threaded in the hole 11 of the conduit 12, the threaded portion of the sleeve 15 being designated by the reference numeral 18. Contiguous its outer end 17 the sleeve 15 is enlarged at 19 to provide a wrench-accommodating portion, to thereby permit the sleeve to be secured within the hole 11 of the conduit 12 with speed and facility.

The inward or lower end of the sleeve 15 has on the upstream side thereof an extension 20 which projects longitudinally beyond the sleeve into the interior of the conduit 12. Pivoted on the extension 20 on an axis extending chordally of the sleeve 15 is a flow-indicating arm 21 which is arranged to be swung from a normal gravity-induced, perpendicular position across the conduit 12 to a fluid flow-induced, horizontal position across the lower end 16 of the sleeve 15. As clearly shown in Figure 2, the arm has its free end laterally and arcuately bent in the upstream direction to provide a vane 22, the vane 22 being in the depending position in the horizontal position of the arm 21 so as to maintain the arm 21 in the horizontal position in response to the flow of fluid through the conduit 12, in the direction of the arrow. The pivotal support for the arm 21 includes an eye 23 formed on the supported end of the arm 21, the eye receiving a horizontally disposed pivot pin 24 carried by the extension 20.

Mounted on the down stream face 25 of the arm 21 contiguous to the eyelet 23 is a light reflector 26 which is visually observable through the sleeve 15 when the arm 21 is in horizontal operated position, as illustrated in Figure 2.

Contiguous to and spaced from its end 16, the sleeve 15 is provided with a radially inwardly extending seat 27. Bridging the interior of the sleeve 15 and resting upon the seat 27 is a transparent sight glass 28 which permits the visual observation of the reflector 26 carried by the arm 21. Carried interiorly of the sleeve 15 is a locking tube 29 which engages the sighting glass 28 and detachably secures the latter within the sleeve 15. The locking tube 29 is supported in threaded engagement with the sleeve 15 and is provided with suitable notches, generally indicated by the reference numeral 30, particularly adapting the locking tube for actuation by a spanner wrench.

Interposed between the opposed faces of the sighting glass 28 and the seat 27 and the adjacent end of the locking tube 29 are the gaskets 31 and 32 which form a fluid-tight seal between the sleeve 15 and the sighting glass 28.

In actual use, the arm 21 normally depends in the position illustrated in phantom in Figure 2, when there is no fluid flowing through the conduit 12. Upon flow of fluid through the conduit 12 in the direction indicated by the arrow in Figure 2, the arm 21 is urged into the horizontal position illustrated in Figure 2, wherein the reflector 26 is visually observable through the locking tube 29 and the sighting glass 28. In this manner accurate visual indication of the presence or absence of fluid flow through the conduit 12 can be obtained with speed and facility.

Although only one embodiment of the flow indicator of the present invention has been described, it is readily apparent that numerous modifications can be made without departing from the spirit of the invention as set forth in the appended claims.

What I claim is:

1. In a flow indicator for a conduit, a sleeve adapted to extend radially through a hole in the side wall of the pipe, said sleeve having open outward and inward ends, a radially inwardly projecting seat at the inward end of the sleeve, a translucent glass seated on the seat, a retainer ring secured in the sleeve and holding the glass on the seat, a flow operated arm pivoted on the inward end of the sleeve to swing from a first position across the conduit to a second fluid flow-induced position across the inward end of said sleeve, and means on one side of said arm visible through said glass while the arm is in the second position as a result of flow of fluid through the conduit.

2. In combination, a fluid conduit having a top wall formed with a vertical axis hole, a vertical sleeve secured in the hole, said sleeve having open upper and lower ends, the lower end being located at the under side of the conduit top wall, an extension on the lower end of the sleeve on the upstream side thereof and depending below the sleeve into the conduit, an arm having an end horizontally pivoted on said extension on an axis extending chordally with respect to said tube and having a free end, said arm normally occupying a gravity-induced depending vertical position across the conduit and being adapted to occupy an elevated horizontal flow-induced position across the lower end of said sleeve, said arm having an upstream side and a downstream side, a light reflector secured to the downstream side of the arm to register with the open lower end of said sleeve in the horizontal position of said arm, and sight glass means extending across the interior of said sleeve for exposing the reflector to light passing downwardly through the sleeve.

3. In combination, a fluid conduit having a top wall formed with a vertical axis hole, a vertical sleeve secured in the hole, said sleeve having open upper and lower ends, the lower end being located at the underside of the conduit top wall, an extension on the lower end of the sleeve on the upstream side thereof and depending below the sleeve into the conduit, an arm having an end horizontally pivoted on said extension on an axis extending chordally with respect to said tube and having a free end, said arm normally occupying a gravity-induced depending vertical position across the conduit and being adapted to occupy an elevated horizontal flow-induced position across the lower end of said sleeve, said arm having an upstream side and a downstream side, a light reflector secured to the downstream side of the arm to register with the open lower end of said sleeve in the horizontal position of said arm, and sight glass means extending across the interior of said sleeve for exposing the reflector to light passing downwardly through the sleeve, said free end of the arm having a vane thereof deflected toward the upstream side of the arm, said vane coacting with fluid flowing through the conduit in the horizontal position of said arm to maintain the arm in horizontal position during flow of fluid through the conduit.

ALEX KEHM.

REFERENCES CITED

The following references are of record in the file of this patent:

UNITED STATES PATENTS

| Number | Name | Date |
|---|---|---|
| 1,090,669 | Woodington | Mar. 17, 1914 |
| 1,257,824 | Ebert | Feb. 26, 1918 |
| 1,428,645 | McDonnell | Sept. 12, 1922 |
| 1,574,460 | Williamson | Feb. 23, 1926 |
| 2,034,373 | Bilde | Mar. 17, 1936 |
| 2,520,219 | McDonnell | Aug. 29, 1950 |